(12) United States Patent
Teratani et al.

(10) Patent No.: US 8,178,455 B2
(45) Date of Patent: May 15, 2012

(54) ALUMINA SINTERED BODY, METHOD FOR MANUFACTURING THE SAME, AND SEMICONDUCTOR MANUFACTURING APPARATUS MEMBER

(75) Inventors: Naomi Teratani, Nagoya (JP); Toru Hayase, Nagoya (JP); Yuji Katsuda, Tsushima (JP); Masahiro Kida, Yatomi (JP)

(73) Assignee: NGK Insulatores, Ltd., Nagoya (JP)

( * ) Notice: Subject to any disclaimer, the term of this patent is extended or adjusted under 35 U.S.C. 154(b) by 109 days.

(21) Appl. No.: 12/722,773

(22) Filed: Mar. 12, 2010

(65) Prior Publication Data
US 2010/0248935 A1    Sep. 30, 2010

(30) Foreign Application Priority Data

Mar. 26, 2009 (JP) .................... 2009-077266
Aug. 31, 2009 (JP) .................... 2009-200753
Jan. 20, 2010 (JP) .................... 2010-010001

(51) Int. Cl.
*C04B 35/10* (2006.01)
*C04B 35/443* (2006.01)

(52) U.S. Cl. .................. 501/127; 501/118; 501/151

(58) Field of Classification Search ............ 501/118, 501/127, 151
See application file for complete search history.

(56) References Cited

U.S. PATENT DOCUMENTS 7,547,407 B2    6/2009   Matsuda et al.
2010/0056358 A1*  3/2010   Teratani et al. ............. 501/119

FOREIGN PATENT DOCUMENTS

| JP | 8806575 | * | 9/1988 |
| JP | 2666744 B2 | | 10/1997 |
| JP | 2001328860 | * | 11/2001 |
| JP | 2005-343733 A1 | | 12/2005 |

* cited by examiner

*Primary Examiner* — Karl Group
(74) *Attorney, Agent, or Firm* — Burr & Brown

(57) ABSTRACT

A method for manufacturing an alumina sintered body of the present invention comprises: (a) forming a mixed powder containing at least $Al_2O_3$ and $MgF_2$ or a mixed powder containing $Al_2O_3$, $MgF_2$, and MgO into a compact having a predetermined shape; and (b) performing hot-press sintering of the compact in a vacuum atmosphere or a non-oxidizing atmosphere to form an alumina sintered body, in which when a amount of $MgF_2$ to 100 parts by weight of $Al_2O_3$ is represented by X (parts by weight), and a hot-press sintering temperature is represented by Y (° C.), the hot-press sintering temperature is set to satisfy the following equations (1) to (4)

$$1,120 \leq Y \leq 1,300 \quad (1)$$

$$0.15 \leq X \leq 1.89 \quad (2)$$

$$Y \leq -78.7X + 1,349 \quad (3)$$

$$Y \geq -200X + 1,212 \quad (4).$$

10 Claims, 4 Drawing Sheets

ALUMINA SINTERED BODY, METHOD FOR MANUFACTURING THE SAME, AND SEMICONDUCTOR MANUFACTURING APPARATUS MEMBER

BACKGROUND OF THE INVENTION

1. Field of the Invention

The present invention relates to an alumina sintered body, a method for manufacturing the alumina sintered body, and a semiconductor manufacturing apparatus member.

2. Description of the Related Art

At the present day, in steps for semiconductor wafers, such as transportation, exposure, film-forming process (chemical vapor deposition method, physical vapor deposition method, sputtering, and the like), microfabrication, cleaning, plasma etching, and dicing, a wafer stage which adsorbs/holds a semiconductor wafer using a coulomb force or a Johnson-Rahbek force is used. As the wafer stage, for example, an electrostatic chuck and a susceptor for applying a high frequency wave may be mentioned. For the wafer stage as described above, a dense sintered body in which a flat plate electrode is embedded is used. For example, in Patent Document 1, the wafer stage is manufactured by the following procedure. That is, one surface of a first alumina sintered body sintered beforehand is polished. Next, an electrode paste is printed on the polished surface. Subsequently, after an aluminum powder is formed on the surface of the first alumina sintered body on which the electrode paste is printed to form an alumina compact, hot-press sintering is performed at 1,400° C. to 1,650° C. to form a second alumina sintered body by sintering the alumina compact, and at the same time, a flat plate electrode is formed by sintering the electrode paste. Next, the surface of the first alumina sintered body opposite to the second alumina sintered body is polished to form a wafer stage surface. As a result, a wafer stage having a diameter of approximately 200 mm can be obtained in which the degree of variation in thickness which indicates the variation in thickness from the wafer stage surface to the flat plate electrode is controlled within 0.50 mm. In the wafer stage obtained as mentioned above, finally, the first alumina sintered body functions as a dielectric layer, the second alumina sintered body functions as a support layer, and the flat plate electrode is embedded between the dielectric layer and the support layer.

When hot-press sintering is performed at 1,400° C. to 1,650° C. after the alumina powder is compacted on the surface of the first alumina sintered body sintered beforehand on which the electrode paste is printed, since the sintering temperature of the alumina compact is high, a slight deformation is generated in the first alumina sintered body in some cases. As measures to suppress the deformation as described above, a decrease in sintering temperature of the alumina compact may be considered. For example, in Patent Document 2, a technique in which an alumina compact is sintered at 900° C. to 1,200° C. has been disclosed. In particular, a compact is formed from a mixed powder containing 90 percent by weight of an alumina powder having an average particle diameter of 5 to 50 nm and 10 percent by weight of magnesia and is then sintered at 900° C. to 1,200° C. in an atmosphere containing water vapor at a partial pressure of 0.7 atoms, so that an alumina sintered body is obtained. The technique to decrease the sintering temperature of an alumina compact is useful when an alumina compact is laminated on the first alumina sintered body and is then sintered as disclosed in Patent Document 1, and in addition to that described above, also in other cases, advantages can be obtained in which since the sintering temperature is low, energy consumption in sintering is small, and manufacturing cost of an alumina sintered body can be reduced.

[Patent Document 1] Japanese Unexamined Patent Application Publication No. 2005-343733
[Patent Document 1] Japanese Patent Publication No. 2666744

SUMMARY OF THE INVENTION

However, according to the technique to decrease the sintering temperature of an alumina compact disclosed in Patent Document 2, it is necessary to use an alumina powder having an average particle diameter of 5 to 50 nm, but there has been a problem in that a nano-sized alumina powder as described above is very difficult to handle. Furthermore, from an economical point of view, in order to obtain a sintered material which requires a large amount of a raw material powder, an industrial use of a nano-sized powder as a primary raw material has not been progressively carried out.

The present invention has been conceived to solve the problems as described above, and one object of the present invention is to make possible low-temperature sintering of an alumina powder without using a nano-sized alumina powder. In addition, another object is to provide a dense alumina sintered body having high corrosion resistance to halogen gas plasma.

In order to achieve the above objects, the inventors of the present invention found that when a mixed powder containing industrial $Al_2O_3$ for sintering and $MgF_2$ added thereto is formed into a compact having a predetermined shape, and this compact is sintered by hot pressing in a vacuum atmosphere or a non-oxidizing atmosphere, a dense alumina sintered body can be obtained even at a low temperature, such as 1,120° C. to 1,300° C., and as a result, the present invention was made.

That is, a method for manufacturing an alumina sintered body of the present invention comprises:

(a) forming a mixed powder containing at least $Al_2O_3$ and $MgF_2$ or a mixed powder containing $Al_2O_3$, $MgF_2$, and MgO into a compact having a predetermined shape; and (b) hot-press sintering of the compact in a vacuum atmosphere or a non-oxidizing atmosphere to form an alumina sintered body, in which when an amount of $MgF_2$ to 100 parts by weight of $Al_2O_3$ is represented by X (parts by weight), and a hot-press sintering temperature is represented by Y (° C.), the hot-press sintering temperature is set to satisfy the following equations (1) to (4).

$$1{,}120 \leq Y \leq 1{,}300 \tag{1}$$

$$0.15 \leq X \leq 1.89 \tag{2}$$

$$Y \leq -78.7X + 1{,}349 \tag{3}$$

$$Y \geq -200X + 1{,}212 \tag{4}$$

An alumina sintered body of the present invention comprises magnesium and fluorine, in which a constituent crystalline phase is substantially composed of only $Al_2O_3$, or as at least one constituent phase other than that of alumina, $MgF_2$ or $MgF_2$ and $MgAl_2O_4$ are contained. In this alumina sintered body, an open porosity is less than 0.1%, the bulk density is 3.95 g/cm³ or more, and a volume resistivity calculated from a current value 1 minute after application of 2 kV/mm at room temperature is $1 \times 10^{14}$ Ω·cm or more. The alumina sintered body as described above may be manufactured by the method for manufacturing an alumina sintered body described above.

A semiconductor manufacturing apparatus member of the present invention is produced by using the alumina sintered body described above.

According to the method for manufacturing an alumina sintered body of the present invention, an alumina powder can be sintered at a low temperature without using a nano-sized alumina powder. In addition, since a dense alumina sintered body can be obtained at 1,300° C. or less, compared to the case in which sintering is performed at a high temperature, energy consumption in sintering is small, and hence manufacturing cost of the alumina sintered body can be reduced. Furthermore, when the manufacturing method of the present invention is applied to the case in which as disclosed in Patent Document 1, the alumina compact is laminated on the first alumina sintered body formed beforehand by sintering the alumina powder and is then sintered to form the second alumina sintered body, the first alumina sintered body is prevented from being deformed.

Since being dense and having high corrosion resistance to halogen gas plasma, the alumina sintered body of the present invention is effectively used for a semiconductor manufacturing apparatus member (for example, wafer stage such as an electrostatic chuck or a susceptor for high frequency application). In the alumina sintered body of the present invention, since $MgF_2$ having very high corrosion resistance in fluorine-based plasma is added, this alumina sintered body is preferably used in fluorine-based plasma. In addition, when the alumina sintered body of the present invention is manufactured by the method for manufacturing an alumina sintered body described above, since manufacturing cost for sintering is reduced, this alumina sintered body can be provided at a low cost corresponding to the reduction described above.

DETAILED DESCRIPTION OF THE INVENTION

Figure 1:
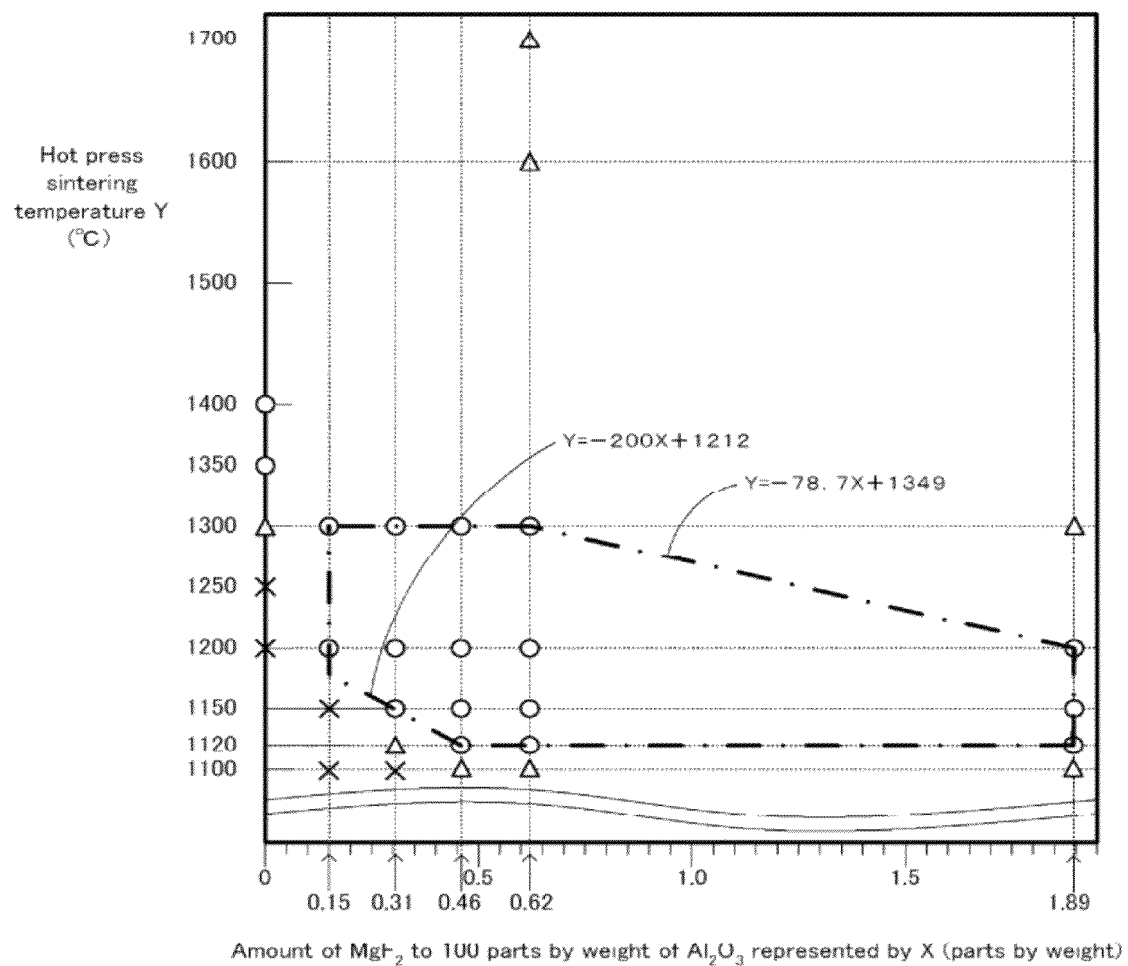
FIG. 1 is a graph showing the relationship of the quality of an obtained alumina sintered body with a content X (parts by weight) of $MgF_2$ to 100 parts by weight of $Al_2O_3$ and a hot-press sintering temperature Y (° C.).

In a method for manufacturing an alumina sintered body of the present invention, in a step (a), a mixed powder at least containing $Al_2O_3$ and $MgF_2$ or a mixed powder containing $Al_2O_3$, $MgF_2$, and MgO is formed into a compact having a predetermined shape. In this step, an amount of $MgF_2$ is preferably set to 0.15 to 1.89 parts by weight to 100 parts by weight of $Al_2O_3$. When the amount of $MgF_2$ is in the range described above, by setting a hot-press sintering temperature to satisfy the above equations (1) to (4), a dense alumina sintered body can be obtained at a low temperature. In addition, although an amount of MgO is not particularly limited, for example, the content thereof to 100 parts by weight of $Al_2O_3$ is preferably set to 0.02 to 0.5 parts by weight and more preferably set to 0.04 to 0.2 parts by weight.

Although $Al_2O_3$ used in the step (a) is not particularly limited, $\alpha$-$Al_2O_3$ having an average particle diameter of 0.1 to 1 μm is preferable. Since an $Al_2O_3$ powder having the particle diameter size as described above is commercially available, it can be easily obtained, and since the above $Al_2O_3$ powder is not so fine as compared to nanoparticles, the handling can be easily performed. In addition, since $Al_2O_3$ having a high purity is preferably used, for example, $Al_2O_3$ having a purity of 99% or more is preferable, and $Al_2O_3$ having a purity of 99.9% or more is particularly preferable. Although $MgF_2$ and MgO to be used are not particularly limited, powders each having an average particle diameter of 0.1 to 1 μm and a purity of 99% or more are preferable.

When the compact having a predetermined shape is formed from the mixed powder in the step (a), for example, after the mixed powder is wet-mixed in an organic solvent to form slurry, and the slurry is dried to form a blended powder, this blended powder may be formed. When wet mixing is performed, a mixing and pulverizing machine, such as a pot mill, a trommel, or an attrition mill, may be used. In addition, instead of wet mixing, dry mixing may also be used. In forming the blended powder, when a plate compact is manufactured, a press-molding method may also be used. The molding pressure is not particularly limited as long as the shape is maintained. A powder itself may also be filled in a hot-press die.

In the method for manufacturing an alumina sintered body of the present invention, in a step (b), when the amount of $MgF_2$ to 100 parts by weight of $Al_2O_3$ is represented by X (parts by weight), and the hot-press sintering temperature is represented by Y (° C.), the hot-press sintering temperature is set so as to satisfy the above equations (1) to (4). When the press pressure in hot-press sintering is too low, the sintered body may not be densified in some cases, and although any problems may not particularly occur even when the pressure is too high, in consideration of the limitations of the apparatus and the like, the press pressure at least at the maximum temperature in sintering is preferably set to 30 to 300 kgf/cm$^2$ and more preferably set to 50 to 200 kgf/cm$^2$. In addition, when the hot-press sintering temperature is too low, the sintered body may not be densified in some cases, and when it is too high, since the size of each alumina grain after sintering is excessively increased and/or the size of each pore is increased in some cases, the strength of the sintered body may be decreased. However, through intensive research carried out by the inventors of the present invention, it was found that a preferable hot-press sintering temperature Y (° C.) to obtain a dense alumina sintered body depends on the content X (parts by weight) of $MgF_2$ to 100 parts by weight of $Al_2O_3$. That is, it was found that the hot-press temperature Y (° C.) must be set to satisfy the above equations (1) to (4). When sintering is performed at a hot-press sintering temperature which is set as described above, a dense alumina sintered body, that is, in particular, an alumina sintered body having an open porosity of less than 0.1%, a bulk density of 3.95 g/cm$^3$ or more, and a volume resistivity of 1×10$^{14}$ or more calculated from a current value 1 minute after application of 2 kV/mm at room temperature, can be obtained. When MgO is contained in the compact, compared to the case in which no MgO is contained, the average particle diameter of the sintered body tends to decrease, and corresponding to this decrease, the strength is likely to increase. The hot-press sintering is performed in a vacuum atmosphere or a non-oxidizing atmosphere. In the non-oxidizing atmosphere, a nitrogen gas or an argon gas may be used. Although the reason the hot-press sintering must be performed in the method for manufacturing an alumina sintered body of the present invention is believed that in the sintering process, since a liquid phase containing an F component is formed from part of $MgF_2$ and/or is formed by a reaction between $MgF_2$ and alumina, the densification of this material is facilitated, it is believed that since in this process, this material is placed in a hot-press die in a highly airtight state, the F component necessary for the densification is suppressed from being evaporated out of the material. In sintering performed in a vacuum atmosphere without using a hot-press or sintering performed under general atmospheric conditions, since a large amount of the F component of $MgF_2$ is evaporated or oxidized, it is not preferable. The time for maintaining the sintering temperature may be appropriately determined in consideration of the composition and the sintering temperature and may be set, for example, in the range of 0.5 to 10 hours.

In the method for manufacturing an alumina sintered body of the present invention, in the step (a), when or after the mixed powder is formed into a compact, a first electrode raw material containing WC, $Al_2O_3$, and at least one transition metal selected from the group consisting of Ni and Co or a second electrode raw material containing $Al_2O_3$ and at least one transition metal selected from the group consisting of Ni and Co may be shaped to have a predetermined shape and may then be embedded in or laminated on the above compact. For example, a first electrode raw material or a second electrode raw material may be shaped to have a predetermined shape and laminated on an alumina sintered body which is separately formed and then a compact may be laminated on the shaped raw material, or a first electrode raw material or a second electrode raw material shaped to have a predetermined shape may be laminated on one compact of two compacts and the other compact may be laminated on the shaped raw material. When the first electrode raw material or the second electrode raw material is used, an electrode having a low electrical resistivity can be embedded in or laminated on the alumina sintered body even at a low sintering temperature of 1,120° C. to 1,300° C. in the step (b). In addition, as the electrode, for example, there may be mentioned a heater electrode used when the alumina sintered body is heated or an electrostatic chuck electrode used when a wafer or the like is adsorbed on one surface of the alumina sintered body by an electrostatic force. In particular, since the electrical resistivity of the electrode manufactured by the method described above can be decreased even by low-temperature sintering, the electrode is useful as a heater electrode. When an alumina sintered body in which a heater electrode is embedded is used as a semiconductor manufacturing apparatus member, in the semiconductor manufacturing apparatus member, the surface of an alumina base can be uniformly heated, so that the wafer temperature can be kept at constant.

In addition, the first electrode raw material may be primarily composed of WC or a transition metal. When WC is contained as a primary component, 1.5 parts by weight or more (preferably 5 parts by weight or more) of the transition metal is preferably used when the total weight of WC and the transition metal is set to 100 parts by weight. The reason for this is that by this composition, the electrode can be densified even at a low sintering temperature, and the electrical resistivity thereof can be sufficiently decreased. In this case, the amount of $Al_2O_3$ is preferably set to 2 to 30 parts by weight. The reason for this is that an interfacial bonding strength between the alumina sintered body and the electrode containing $Al_2O_3$ is increased. However, when $Al_2O_3$ is excessively added, since the electrical resistivity of the electrode is increased, the above addition range is preferable.

In addition, the second electrode raw material is primarily composed of Ni or Co. Since Ni or Co has a low electrical resistivity as compared to that of the first electrode raw material, even when the electrode is formed by mixing $Al_2O_3$, a low electrical resistivity can be obtained. The addition amount of $Al_2O_3$ is preferably set to 5 to 50 parts by weight to 100 parts by weight of Ni or Co. When the amount is less than 5 parts by weight, it is not preferable since an interfacial bonding strength between the alumina sintered body and the electrode is low after sintering, and separation may partially occur at the interface, and when the amount is more than 50 parts by weight, it is not preferable since the electrical resistivity of the electrode is not sufficiently decreased. In addition, when the first or the second electrode raw material is shaped to have a predetermined shape and is then embedded in the compact, the first or the second electrode raw material may be entirely embedded in the compact, or the first or the second electrode raw material may be partially embedded in the compact.

In the alumina sintered body of the present invention, magnesium and fluorine are contained; as a constituent crystalline phase, $Al_2O_3$ is only contained, or $MgF_2$ or $MgF_2$ and $MgAl_2O_4$ are contained as constituent phases other than that of alumina; the open porosity is less than 0.1%; the bulk density is 3.95 g/cm$^3$ or more; and the volume resistivity calculated from a current value 1 minute after application of 2 kV/mm at room temperature is $1 \times 10^{14}$ Ω·cm or more. The alumina sintered body as described above may be manufactured by the method for manufacturing an alumina sintered body described above. The case in which magnesium and fluorine are contained, and the constituent crystalline phase is composed of only $Al_2O_3$ indicates that only a peak which substantially coincides with that of $Al_2O_3$ is present in an x-ray diffraction profile, and peaks of crystalline materials derived from contained magnesium and fluorine cannot be identified. As a concrete example in which although magnesium and fluorine are contained, only the crystalline phase of $Al_2O_3$ is identified, and that of $MgF_2$ is not identified, the case may be mentioned in which, for example, when the content of $MgF_2$ is very low, and sintering is performed at a temperature close to 1,300° C. which is more than the melting point of $MgF_2$, added $MgF_2$ is partially dispersed, solid-soluted in $Al_2O_3$, or non-crystallized, and as a result, $MgF_2$ hardly remains in the form of crystal. In addition, $MgF_2$ or $MgF_2$ and $MgAl_2O_4$ contained as constituent phases besides alumina have high fluorine-based plasma corrosion resistance and is a suitable constituent component, particularly, for a semiconductor manufacturing apparatus member. Hence, although constituent phases other than those mentioned above are preferably not contained in view of plasma corrosion resistance, a certain amount of a hetero phase which may not degrade various characteristics, such as plasma corrosion resistance and low temperature sintering ability, of the alumina sintered body which is the material of the present invention may be contained, and a very small amount of impurities which may not be detected in an x-ray diffraction profile may also be contained. In the alumina sintered body of the present invention, the reason the open porosity is set to less than 0.1%, the bulk density is set to 3.95 g/cm$^3$ or more, and the volume resistivity calculated from a current value at 1 minute from application of 2 kV/mm at room temperature is set to $1 \times 10^{14}$ Ω·cm or more is that in the case in which the above conditions are not satisfied, current leakage may unfavorably occur when the alumina sintered body is used as a component of a semiconductor manufacturing apparatus. In addition, the open porosity and the bulk density are measured by an Archimedes method using pure water as a medium.

The alumina sintered body of the present invention preferably has a relative density of 99% or more and more preferably 99.5% or more. Accordingly, when the alumina sintered body is used as a component of a semiconductor manufacturing apparatus, the current leakage can be more reliably prevented. Incidentally, the relative density is obtained by the following procedure. That is, based on the assumption in which the individual raw materials ($Al_2O_3$, $MgF_2$, and MgO) remain in the alumina sintered body as their original compositions, the theoretical density of the sintered body is obtained from the theoretical density of each raw material and the content (parts by weight) thereof. Subsequently, the bulk density obtained by an Archimedes method is divided by the theoretical density of the sintered body and is then multiplied by 100, and the value thus obtained is regarded as the relative density (%) of the sintered body. Accordingly, when the amounts of the individual raw materials are equal to each other, as the bulk density is increased, the relative density is increased.

The flexural strength of the alumina sintered body of the present invention is preferably 200 MPa or more and more preferably 300 MPa or more. When the strength is 200 MPa or more, the alumina sintered body is preferably used as a semiconductor manufacturing apparatus member. When the alumina sintered body of the present invention is manufactured by the method for manufacturing an alumina sintered body of the present invention, in order to increase the strength, the hot-press sintering temperature is preferably set to 1,120° C. to 1,200° C., or MgO is preferably added to the mixed powder. When the hot-press sintering temperature is set to 1,120° C. to 1,200° C., compared to the case in which the temperature is set to more than 1,200° C., the size of each grain of the sintered body is not excessively increased, and a sufficient strength can be obtained. In addition, when MgO is added to the mixed powder, compared to the case in which MgO is not added, since the grain growth of the sintered body is suppressed, a sufficient strength can be obtained.

The alumina sintered body of the present invention preferably contains 0.03 to 0.8 percent by weight of Mg and 0.01 to 1.2 percent by weight of F. When the contents of Mg and F are in the ranges described above, a dense alumina sintered body can be obtained at 1,300° C. or less which is lower than a sintering temperature at which a conventional high-density alumina can be obtained.

A first electrode containing WC, $Al_2O_3$, and at least one transition metal selected from the group consisting of Ni and Co or a second electrode containing $Al_2O_3$ and at least one transition metal selected from the group consisting of Ni and Co may be embedded in or laminated on the alumina sintered body of the present invention. The first electrode or the second electrode may be entirely embedded in the alumina sintered body or may be partially embedded in the alumina sintered body. In the method for manufacturing an alumina sintered body of the present invention, the first electrode or the second electrode is formed in such a way that in the step (a), when or after the mixed powder is formed into a compact, the first electrode raw material containing WC, $Al_2O_3$, and at least one transition metal selected from the group consisting of Ni and Co or the second electrode raw material containing $Al_2O_3$ and at least one transition metal selected from the group consisting of Ni and Co is shaped into a predetermined shape and is embedded in or laminated on the compact, and in the subsequent step (b), when this compact is hot-press sintered at 1,300° C. or less to form the alumina sintered body, the first electrode raw material or the second electrode raw material can be simultaneously formed into the first electrode or the second electrode. In step (a), when a first electrode raw material or a second electrode raw material is shaped to have a predetermined shape and then be embedded in or laminated on the compact, for example, a first electrode raw material or a second electrode raw material may be shaped to have a predetermined shape and laminated on an alumina sintered body which is separately formed and then a compact may be laminated on the shaped raw material, or a first electrode raw material or a second electrode raw material shaped to have a predetermined shape may be laminated on one compact of two compacts and the other compact may be laminated on the shaped raw material.

The alumina sintered body of the present invention is preferably manufactured by the method for manufacturing an alumina sintered body of the present invention. Accordingly, the alumina sintered body of the present invention can be relatively easily obtained.

A semiconductor manufacturing apparatus member of the present invention is produced using the alumina sintered body of the present invention. As the semiconductor manufacturing apparatus member, that is, as a member (component) used for a semiconductor manufacturing apparatus, for example, an electrostatic chuck, a ceramic heater, or a susceptor may be mentioned.

In this specification, as a method for manufacturing an electrode, a method is also disclosed in which after the first electrode raw material containing WC, $Al_2O_3$, and at least one transition metal selected from the group consisting of Ni and Co or the second electrode raw material containing $Al_2O_3$ and at least one transition metal selected from the group consisting of Ni and Co is shaped into a predetermined shape, sintering is performed at 1,120° C. to 1,300° C. According to this method for manufacturing an electrode, after the first electrode raw material or the second electrode raw material is embedded in or laminated on the ceramic compact which is to be processed by low-temperature sintering at approximately 1,200° C., this ceramic compact and the first electrode raw material or the second electrode raw material can be processed by low-temperature sintering at approximately 1,200° C.

EXAMPLES

A. Examples 1 to 26, and Comparative Examples 1 to 20

1. Raw Material Powder

As raw material powders, the following were used. As an $Al_2O_3$ powder, a commercially available powder (A) having a purity of 99.99% or more and an average particle diameter of 0.1 to 0.2 µm, a commercially available powder (B) having a purity of 99.995% or more and an average particle diameter of 0.4 to 0.6 µm, or a commercially available powder (C) having a purity of 99.5% or more and an average particle diameter of 0.3 to 0.5 µm was used. As a $MgF_2$ powder, a commercially available powder having a purity of 99.9% or more was used, and a powder having an average particle diameter of 0.3 to 1 µm obtained therefrom by preliminary pulverization was used. A $CaF_2$ powder and an $AlF_3$ powder were also prepared as described above. In the preliminary pulverization, isopropyl alcohol was used as a solvent, and pot mill pulverization was performed using zirconia balls. In addition, as a MgO powder, a commercially available powder having a purity of 99.9% or more and an average particle diameter of 1 µm or less was used.

2. Mixed Powder Preparation

The individual powders were weighed on a parts by weight basis as shown in Tables 1 and 2, and by using isopropyl alcohol as a solvent, wet mixing was performed for 4 hours using alumina balls each having a diameter of 5 mm and a nylon-made pot. After mixing, the mixture was dried in a nitrogen flow at 110° C. to remove the solvent. Subsequently, the mixture thus obtained was allowed to pass through a 30-mesh sieve, so that a mixed powder was obtained. As the solvent used in the mixing, ion-exchange water may be used, and the mixed powder may be obtained by drying using a rotary evaporator, followed by filtration using a 100-mesh sieve, or a granulated powder may also be obtained by using a spray drier or the like. In addition, whenever necessary, the mixed powder was processed by a heat treatment in the atmosphere at 450° C. for 5 hours or more, so that a carbon component which was mixed in during the wet mixing was removed by sintering.

3. Forming

The mixed powder was formed by uniaxial pressing at a pressure of 30 kgf/cm$^2$ to form a disk-shaped compact having a diameter of 50 mm and a thickness of approximately 20 mm, and the compact was then placed in a graphite die used for sintering. The press pressure was not particularly limited as long as the shape was maintained, and the mixed powder itself may be filled in a graphite die which is used for sintering.

4. Sintering

Sintering was performed using a hot-press method. A press pressure was set to 200 kgf/cm$^2$ as shown in Tables 1 and 2, and a vacuum state was maintained until the sintering was completed. A holding time at the maximum temperature was set to 4 to 8 hours.

5. Evaluation

The obtained sintered body was processed for various evaluations, and the following evaluations were performed.
(1) Open Porosity/Bulk Density
Measurement was performed by an Archimedes method using pure water as a medium. For the measurement, a flexural bar having a size of 3 mm×4 mm×40 mm was used, and among surfaces thereof, only a tensile surface was finished by #800, and the other surfaces were finished by #400.
(2) Relative Density
The relative density was calculated based on the assumption in which the composition shown in Tables 1 and 2 was maintained after sintering. In particular, based on the assumption in which the individual raw materials ($Al_2O_3$, $MgF_2$, and the like) remained in the sintered body as their original compositions, the theoretical density of the sintered body was obtained from the theoretical density of each raw material and the content (parts by weight) thereof. Subsequently, the bulk density obtained by an Archimedes method was divided by the theoretical density of the sintered body and was then multiplied by 100, and the value thus obtained was regarded as the relative density (%) of the sintered body. The densities used for the calculation were 3.987 g/cm$^3$ for $Al_2O_3$, 3.2 g/cm$^3$ for $MgF_2$, 3.58 g/cm$^3$ for MgO, 5.8 g/cm$^3$ for $CaF_2$, and 2.88 g/cm$^3$ for $AlF_3$.
(3) Flexural Strength
A four-point flexural test was performed in accordance with JIS R1601, and the flexural strength was calculated. In addition, the numerical values shown in Tables 1 and 2 were each obtained after the first digit was rounded.
(4) Volume Resistivity
By a method in accordance with JIS C2141, measurement was performed in the air atmosphere at room temperature. A test specimen had a diameter of 50 mm and a thickness of 0.5 to 1 mm, and individual electrodes were formed using silver so that a main electrode had a diameter of 20 mm, a guard electrode had an inside diameter of 30 mm and an outside diameter of 40 mm, and an application electrode had a diameter of 40 mm. An application voltage was set to 2 kV/mm, and a current value 1 minute after the voltage application was read, so that a room-temperature volume resistivity was calculated from the current value.
(5) Crystalline Phase
The crystalline phase was identified by an x-ray diffraction apparatus (D8 ADVANCE manufactured by Bruker AXS). The measurement was performed with CuKα at 40 kV, 40 mA, and 2θ=10° to 70°.
(6) Chemical Analysis
The content of Mg was obtained by an induction coupled plasma (ICP) emission spectral analysis. The measurement lower limit of the Mg content is 1 ppm. In addition, the F content was obtained by a thermal hydrolytic separation-ion chromatographic method (JIS R9301-3-11). In addition, the measurement lower limit of the F content is 10 ppm.
(7) Average Particle Diameter
The average particle diameter was obtained by a line intersection method. In particular, an arbitrary number of lines were drawn on a photograph obtained by observation of a fractured surface of each sintered body using a scanning electron microscope (SEM), and an average segment length was obtained. Since the accuracy is improved as the number of grains intersecting the lines is increased, although the number of lines is changed in accordance with the particle diameter, the number of lines is set so as to intersect approximately 60 grains. The average particle diameter was estimated by multiplying the average segment length by a factor which was determined by the shape of the grain. In this case, the factor was set to 1.5.

TABLE 1

|  | Raw material (Parts by weight) | | | | | Condition | | | Sintered body | | |
|---|---|---|---|---|---|---|---|---|---|---|---|
|  | $Al_2O_3$[X1] | $MgF_2$ | MgO | $CaF_2$ | $AlF_3$ | Sintering temperature (° C.) | Holding time (h) | Atmosphere | HP pressure (kg/cm$^2$) | Mg (wt %) | F (wt %) | Open porosity (%) |
| Example 1 | 100 (A) | 0.15 | — | — | — | 1200 | 4 | vac. | 200 | 0.05 | 0.07 | <0.1 |
| Example 2 | 100 (A) | 0.15 | — | — | — | 1300 | 4 | vac. | 200 | 0.04 | 0.05 | <0.1 |
| Example 3 | 100 (A) | 0.31 | — | — | — | 1150 | 4 | vac. | 200 | 0.12 | 0.18 | <0.1 |
| Example 4 | 100 (A) | 0.31 | — | — | — | 1200 | 4 | vac. | 200 | 0.10 | 0.15 | <0.1 |
| Example 5 | 100 (A) | 0.31 | — | — | — | 1300 | 4 | vac. | 200 | 0.07 | 0.11 | <0.1 |
| Example 6 | 100 (A) | 0.46 | — | — | — | 1120 | 4 | vac. | 200 | 0.17 | 0.27 | <0.1 |
| Example 7 | 100 (A) | 0.46 | — | — | — | 1150 | 4 | vac. | 200 | 0.17 | 0.25 | <0.1 |
| Example 8 | 100 (A) | 0.46 | — | — | — | 1200 | 4 | vac. | 200 | 0.15 | 0.22 | <0.1 |
| Example 9 | 100 (A) | 0.46 | — | — | — | 1300 | 4 | vac. | 200 | 0.11 | 0.16 | <0.1 |
| Example 10 | 100 (A) | 0.62 | — | — | — | 1120 | 4 | vac. | 200 | 0.24 | 0.35 | <0.1 |

TABLE 1-continued

| | | | | | | | | | | | |
|---|---|---|---|---|---|---|---|---|---|---|---|
| Example 11 | 100 (A) | 0.62 | — | — | — | 1150 | 4 | vac. | 200 | 0.23 | 0.37 | <0.1 |
| Example 12 | 100 (A) | 0.62 | 0.08 | — | — | 1150 | 4 | vac. | 200 | 0.28 | 0.37 | <0.1 |
| Example 13 | 100 (A) | 0.62 | 0.2 | — | — | 1150 | 4 | vac. | 200 | 0.34 | 0.38 | <0.1 |
| Example 14 | 100 (A) | 0.62 | — | — | — | 1200 | 4 | vac. | 200 | 0.24 | 0.29 | <0.1 |
| Example 15 | 100 (A) | 0.62 | — | — | — | 1300 | 4 | vac. | 200 | 0.17 | 0.20 | <0.1 |
| Example 16 | 100 (A) | 0.62 | 0.08 | — | — | 1200 | 4 | vac. | 200 | 0.27 | 0.36 | <0.1 |
| Example 17 | 100 (A) | 0.62 | 0.2 | — | — | 1200 | 4 | vac. | 200 | 0.34 | 0.36 | <0.1 |
| Example 18 | 100 (B) | 0.31 | — | — | — | 1200 | 4 | vac. | 200 | 0.11 | 0.17 | <0.1 |
| Example 19 | 100 (B) | 0.31 | 0.08 | — | — | 1200 | 4 | vac. | 200 | 0.13 | 0.18 | <0.1 |
| Example 20 | 100 (B) | 0.62 | — | — | — | 1200 | 4 | vac. | 200 | 0.23 | 0.31 | <0.1 |
| Example 21 | 100 (C) | 0.62 | — | — | — | 1200 | 4 | vac. | 200 | 0.22 | 0.30 | <0.1 |
| Example 22 | 100 (A) | 1.89 | — | — | — | 1120 | 4 | vac. | 200 | 0.70 | 1.03 | <0.1 |
| Example 23 | 100 (A) | 1.89 | — | — | — | 1150 | 4 | vac. | 200 | 0.70 | 1.01 | <0.1 |
| Example 24 | 100 (A) | 1.89 | — | — | — | 1200 | 4 | vac. | 200 | 0.69 | 0.89 | <0.1 |
| Example 25 | 100 (A) | 0.62 | 0.08 | — | — | 1300 | 4 | vac. | 200 | 0.19 | 0.21 | <0.1 |
| Example 26 | 100 (B) | 0.62 | — | — | — | 1300 | 4 | vac. | 200 | 0.12 | 0.19 | <0.1 |

| | Sintered body | | | | | |
|---|---|---|---|---|---|---|
| | Bulk density (g/cm$^2$) | Relative density (%) | Volume resistivity ($\Omega \cdot$ cm) | Strength (MPa) | Average particle diameter (μm) | Crystalline phase (other than Al$_2$O$_3$) |
| Example 1 | 3.981 | 99.9 | 7.E+14 | 180 | 14 | MgF$_2$ |
| Example 2 | 3.975 | 99.7 | 2.E+17 | 150 | 23 | — |
| Example 3 | 3.985 | 100 | 9.E+14 | 360 | 2.0 | MgF$_2$ |
| Example 4 | 3.980 | 99.9 | 6.E+14 | 190 | 11 | MgF$_2$ |
| Example 5 | 3.975 | 99.7 | 2.E+17 | 170 | 12 | MgF$_2$ |
| Example 6 | 3.977 | 99.8 | 2.E+15 | 490 | 1.8 | MgF$_2$ |
| Example 7 | 3.982 | 100 | 9.E+14 | 290 | 2.2 | MgF$_2$ |
| Example 8 | 3.973 | 99.7 | 6.E+14 | 170 | 15 | MgF$_2$ |
| Example 9 | 3.972 | 99.7 | 5.E+16 | 130 | 16 | MgF$_2$ |
| Example 10 | 3.978 | 99.9 | 3.E+15 | 380 | 2.1 | MgF$_2$ |
| Example 11 | 3.980 | 99.9 | 1.E+15 | 320 | 2.9 | MgF$_2$ |
| Example 12 | 3.977 | 99.9 | 7.E+14 | 490 | 1.1 | MgF$_2$ MgAl$_2$O$_4$ |
| Example 13 | 3.979 | 99.9 | 8.E+14 | 500 | 1.0 | MgF$_2$ MgAl$_2$O$_4$ |
| Example 14 | 3.915 | 99.8 | 1.E+15 | 180 | 12 | MgF$_2$ |
| Example 15 | 3.973 | 99.8 | 5.E+16 | 140 | 19 | MgF$_2$ |
| Example 16 | 3.975 | 99.8 | 7.E+14 | 450 | 1.4 | MgF$_2$ MgAl$_2$O$_4$ |
| Example 17 | 3.972 | 99.8 | 1.E+15 | 430 | 1.8 | MgF$_2$ MgAl$_2$O$_4$ |
| Example 18 | 3.979 | 99.8 | 6.E+16 | 200 | 7.3 | MgF$_2$ |
| Example 19 | 3.979 | 99.9 | 1.E+17 | 380 | 1.6 | MgF$_2$ MgAl$_2$O$_4$ |
| Example 20 | 3.971 | 99.7 | 1.E+17 | 250 | 4.5 | MgF$_2$ |
| Example 21 | 3.972 | 99.7 | 2.E+15 | 320 | 2.0 | MgF$_2$ |
| Example 22 | 3.958 | 99.6 | 1.E+15 | 370 | 2.5 | MgF$_2$ |
| Example 23 | 3.960 | 99.7 | 3.E+15 | 330 | 3.2 | MgF$_2$ |
| Example 24 | 3.957 | 99.6 | 8.E+15 | 220 | 9.0 | MgF$_2$ |
| Example 25 | 3.966 | 99.6 | 2.E+16 | 230 | 17 | MgF$_2$ MgAl$_2$O$_4$ |
| Example 26 | 3.970 | 99.7 | 2.E+16 | 140 | 20 | MgF$_2$ |

[X1] A commercially available powder (A) having an average particle diameter of 0.1 to 0.2 μm A commercially available powder (B) having an average particle diameter of 0.4 to 0.6 μm A commercially available powder (C) having an average particle diameter of 0.3 to 0.5 μm

TABLE 2

| | Raw material (Parts by weight) | | | | | Condition | | | | Sintered body | | |
|---|---|---|---|---|---|---|---|---|---|---|---|---|
| | Al$_2$O$_3$[X1] | MgF$_2$ | MgO | CaF$_2$ | AlF$_3$ | Sintering temperature (°C.) | Holding time (h) | Atmosphere | HP pressure (kg/cm$^2$) | Mg (wt %) | F (wt %) | Open porosity (%) |
| Comparative Example 1 | 100 (A) | — | — | — | — | 1200 | 8 | vac. | 200 | <1 ppm | <10 ppm | 5.4 |
| Comparative Example 2 | 100 (A) | — | — | — | — | 1250 | 4 | vac. | 200 | <1 ppm | <10 ppm | <0.1 |
| Comparative Example 3 | 100 (A) | — | — | — | — | 1300 | 4 | vac. | 200 | <1 ppm | <10 ppm | <0.1 |
| Comparative Example 4 | 100 (A) | — | — | — | — | 1350 | 4 | vac. | 200 | <1 ppm | <10 ppm | <0.1 |
| Comparative Example 5 | 100 (A) | — | — | — | — | 1400 | 4 | vac. | 200 | <1 ppm | <10 ppm | <0.1 |
| Comparative Example 6 | 100 (B) | — | — | — | — | 1400 | 4 | vac. | 200 | <1 ppm | <10 ppm | <0.1 |
| Comparative Example 7 | 100 (A) | 0.15 | — | — | — | 1100 | 4 | vac. | 200 | 0.08 | 0.10 | 7.9 |
| Comparative Example 8 | 100 (A) | 0.15 | — | — | — | 1150 | 4 | vac. | 200 | 0.06 | 0.09 | 1.6 |
| Comparative Example 9 | 100 (A) | 0.31 | — | — | — | 1100 | 4 | vac. | 200 | 0.12 | 0.19 | 0.7 |
| Comparative Example 10 | 100 (A) | 0.31 | — | — | — | 1120 | 4 | vac. | 200 | 0.11 | 0.19 | 0.30 |
| Comparative Example 11 | 100 (A) | 0.46 | — | — | — | 1100 | 4 | vac. | 200 | 0.17 | 0.27 | <0.1 |
| Comparative Example 12 | 100 (A) | 0.62 | — | — | — | 1100 | 4 | vac. | 200 | 0.25 | 0.35 | <0.1 |

TABLE 2-continued

| | | | | | | | | | | | | |
|---|---|---|---|---|---|---|---|---|---|---|---|---|
| Comparative Example 13 | 100 (A) | 1.89 | — | — | — | 1100 | 4 | vac. | 200 | 0.71 | 1.03 | <0.1 |
| Comparative Example 14 | 100 (A) | 1.89 | — | — | — | 1300 | 4 | vac. | 200 | 0.44 | 0.59 | 0.3 |
| Comparative Example 15 | 100 (B) | 0.62 | — | — | — | 1600 | 4 | vac. | 200 | 0.06 | 0.07 | 0.5 |
| Comparative Example 16 | 100 (B) | 0.62 | — | — | — | 1700 | 4 | vac. | 200 | 0.03 | 0.04 | 0.3 |
| Comparative Example 17 | 100 (A) | 0.62 | — | — | — | 1200 | 4 | vac. | 0 | 0.23 | 0.09 | 26.2 |
| Comparative Example 18 | 100 (A) | 0.62 | — | — | — | 1200 | 4 | air | 0 | 0.23 | 0.02 | 40.5 |
| Comparative Example 19 | 100 (A) | — | — | 0.77 | — | 1200 | 4 | vac. | 200 | — | — | 1.7 |
| Comparative Example 20 | 100 (A) | — | — | — | 0.83 | 1200 | 4 | vac. | 200 | — | — | 4.9 |

| | Sintered body | | | | | |
|---|---|---|---|---|---|---|
| | Bulk density (g/cm³) | Relative density (%) | Volume resistivity (Ω·cm) | Strength (MPa) | Average particle diameter (μm) | Crystalline phase (other than Al₂O₃) |
| Comparative Example 1 | 3.688 | 92.5 | — | — | 0.3 | — |
| Comparative Example 2 | 3.934 | 98.7 | — | — | 0.5 | — |
| Comparative Example 3 | 3.955 | 99.2 | 9.E+14 | 560 | 0.8 | — |
| Comparative Example 4 | 3.985 | 100.0 | 1.E+15 | 520 | 1.6 | — |
| Comparative Example 5 | 3.980 | 99.8 | 3.E+17 | 550 | 2.2 | — |
| Comparative Example 6 | 3.878 | 97.3 | — | — | 2.1 | — |
| Comparative Example 7 | 3.008 | 75.5 | — | 130 | 0.3 | $MgF_2$ |
| Comparative Example 8 | 3.799 | 95.3 | 6.E+12 | 250 | 1.0 | $MgF_2$ |
| Comparative Example 9 | 3.804 | 95.5 | 4.E+13 | 350 | 0.8 | $MgF_2$ |
| Comparative Example 10 | 3.899 | 97.9 | 5.E+14 | 360 | 0.9 | $MgF_2$ |
| Comparative Example 11 | 3.895 | 97.8 | 7.E+14 | 320 | 0.8 | $MgF_2$ |
| Comparative Example 12 | 3.879 | 97.4 | 8.E+14 | 390 | 0.8 | $MgF_2$ |
| Comparative Example 13 | 3.852 | 97.0 | 4.E+16 | 380 | 0.7 | $MgF_2$ |
| Comparative Example 14 | 3.932 | 99.0 | — | <100 | 20 | $MgF_2$ |
| Comparative Example 15 | 3.965 | 99.6 | 1.E+17 | <100 | 46 | — |
| Comparative Example 16 | 3.975 | 99.8 | 2.E+17 | <100 | 42 | — |
| Comparative Example 17 | 2.916 | 73.2 | — | — | 0.6 | $MgAl_2O_4$ |
| Comparative Example 18 | 2.327 | 58.4 | — | — | 0.8 | $MgAl_2O_4$ |
| Comparative Example 19 | 3.697 | 92.4 | 1.E+10 | 370 | 0.4 | $CaF_2$ |
| Comparative Example 20 | 3.676 | 92.6 | 4.E+10 | 190 | — | — |

*¹A commercially available powder (A) having an average particle diameter of 0.1 to 0.2 μm A commercially available powder (B) having an average particle diameter of 0.4 to 0.6 μm A commercially available powder (C) having an average particle diameter of 0.3 to 0.5 μm In Examples 1 to 26 and Comparative Examples 1 to 16, the compacts were each formed using a mixed powder containing $Al_2O_3$ and $MgF_2$, a mixed powder containing $Al_2O_3$, $MgF_2$, and MgO, or only an $Al_2O_3$ powder and were then hot-press sintered at various temperatures. The results are shown in Tables 1 and 2 and FIG. 1. FIG. 1 is a graph showing the relationship of the content X (parts by weight) of $MgF_2$ powder to 100 parts by weight of $Al_2O_3$ powder and the hot-press sintering temperature Y (° C.). In FIG. 1, when the obtained alumina sintered body satisfies all the conditions in which the open porosity is less than 0.1%, the bulk density is 3.95 g/cm³ or more, the relative density is 99.5% or more, and the volume resistivity is $1 \times 10^{14}$ Ω·cm or more, the alumina sintered body is evaluated as "○" (Good); when the above conditions are partially not satisfied, the alumina sintered body is evaluated as "Δ" (partially No Good): and when all the conditions are not satisfied, the alumina sintered body is evaluated as "x" (No Good). From FIG. 1, it is believed that when the hot-press sintering temperature Y (° C.) is set to satisfy the following equations (1) to (4), a good alumina sintered body can be obtained.

$$1{,}120 \leq Y \leq 1{,}300 \quad (1)$$

$$0.15 \leq X \leq 1.89 \quad (2)$$

$$Y \leq -78.7X + 1{,}349 \quad (3)$$

$$Y \geq -200X + 1{,}212 \quad (4)$$

Figure 2:
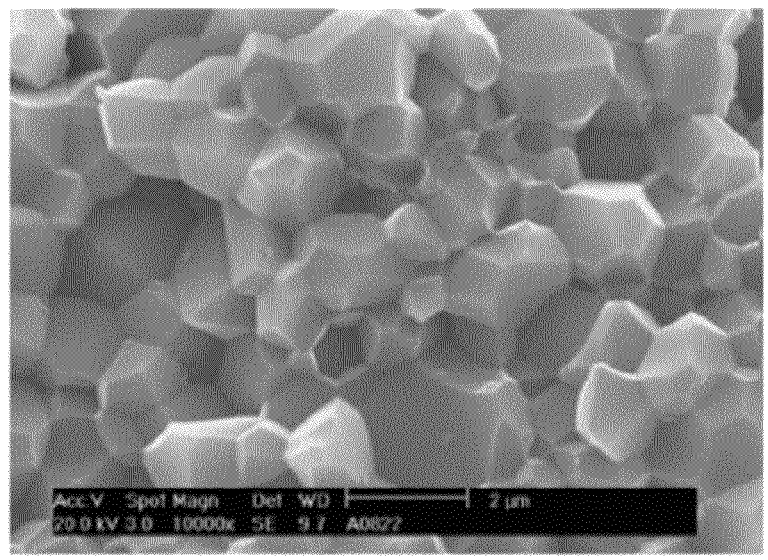
FIG. 2 is a SEM photograph of Example 7.
Figure 3:
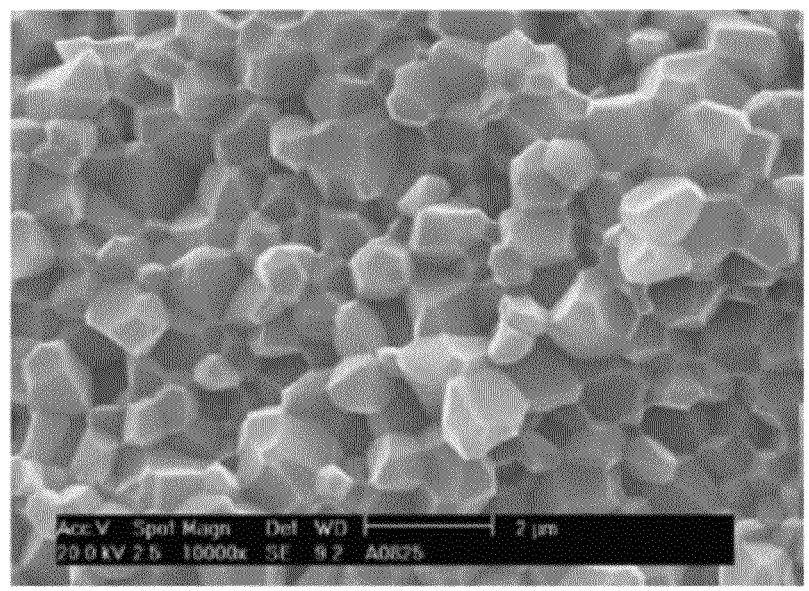
FIG. 3 is a SEM photograph of Example 12.
Figure 4:
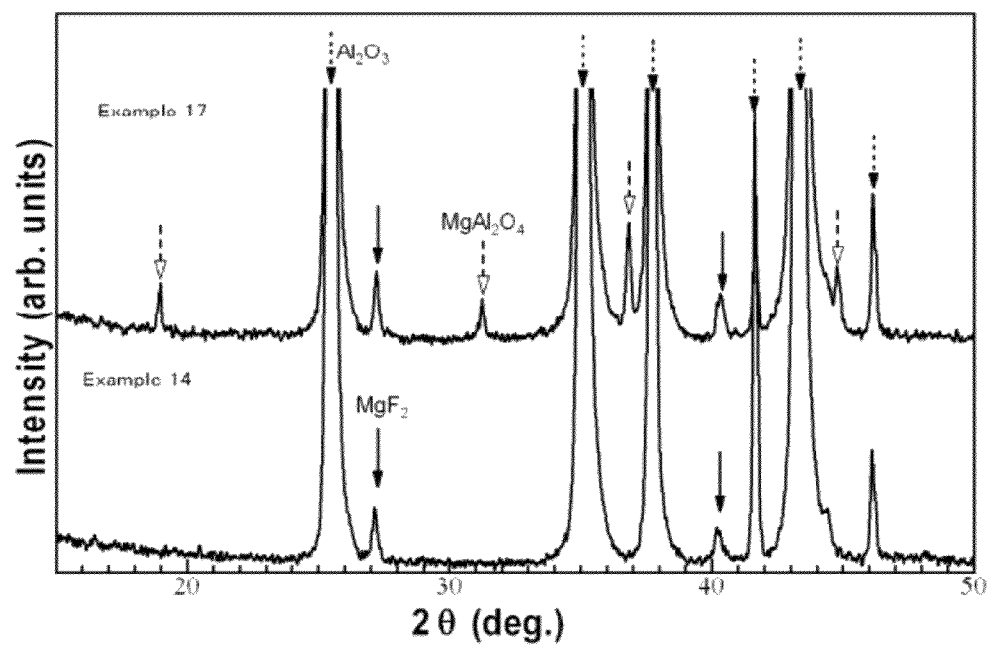
FIG. 4 shows X-ray diffraction profiles of Examples 14 and 17.

In Example 11, the compact was formed using a mixed powder containing $Al_2O_3$ and $MgF_2$ (MgO was not contained) and was hot-press sintered at 1,150° C. to obtain an alumina sintered body, and on the other hand, in Examples 12 and 13, each alumina sintered body was obtained in a manner similar to that in Example 11 except that the compact was formed using a mixed powder containing $Al_2O_3$, $MgF_2$, and MgO. As a result, although a good alumina sintered body was obtained in each of Examples 11 to 13, the flexural strength of each of the Examples 12 and 13 was approximately 1.5 times higher than that of Example 11. A result similar to that described above was also observed between Example 14 and Examples 16 and 17, in each of which the hot-press sintering was performed at 1,200° C., and between Examples 15 and 25, in each of which the hot-press sintering was performed at 1,300° C. The reason the strength is increased by addition of MgO is believed that when MgO was added, the average particle diameter of the alumina sintered body was decreased as compared to that obtained in the case in which MgO was not added. SEM photographs obtained when MgO was added and was not added are shown in FIG. 2 and FIG. 3. FIG. 2 is a SEM photograph of Example 7 (no addition, of MgO), and FIG. 3 is a SEM photograph of Example 12 (addition of MgO). It is found that the average particle diameter shown in FIG. 3 is smaller than that shown in FIG. 2. In addition, an x-ray diffraction profile obtained when MgO was not added and that obtained when MgO was added are shown in FIG. 4. As shown in FIG. 4, in Example 14 (no addition of MgO), although the peak of $Al_2O_3$ and the peak of $MgF_2$ are present, in Example 17 (addition of MgO), besides the peaks of $Al_2O_3$ and $MgF_2$, the peak of $MgAl_2O_4$ is also present. From these results, MgO contained in the compact was changed into $MgAl_2O_3$ with high probability by the hot-press sintering. In addition, the peak intensity of $MgF_2$ is changed in accordance with the addition amount of $MgF_2$ and/or the sintering temperature, and when the addition amount of $MgF_2$ was small or the sintering temperature was increased, the peak intensity was decreased. The reason of the decrease in peak intensity of $MgF_2$ with an increase in sintering temperature might be that $MgF_2$ added as described above was partially volatilized, solid-soluted in $Al_2O_3$ grains, or non-crystallized into glassy components.

In Comparative Examples 1, 2, and 6, when the compact was formed only from an $Al_2O_3$ powder and was then hot-press sintered at 1,200° C. to 1,400° C., a good alumina sintered body could not be obtained in each comparative example. In addition, in Comparative Example 3, although a relatively good sintered body was obtained, the relative density varied approximately 0.4% in every sintering, and a density of less than 3.95 g/cm³ was obtained as a low bulk density, so that a good sintered body could not be stably obtained. Hence, as shown in Comparative Examples 4 and 5, when $MgF_2$ is not added, in order to obtain a good sintered body, a sintering temperature of at least 1,350° C. or more is necessary. In Comparative Examples 17 and 18, after a mixed powder containing $Al_2O_3$ and $MgF_2$ was used and was then preliminary formed using a pressing-mold, although the compact was formed by CIP at 5 t/cm², since hot-press sintering was not used, a good alumina sintered body could not be obtained. In particular, in Comparative Example 17, although vacuum sintering was used without a hot-pressing, a large amount of the F component was lost during the sintering, which is leading to the poor densification of alumina and much amount of $MgAl_2O_4$ formation due to the reaction between remaining MgO and alumina. According to Comparative Example 18 sintered in the air atmosphere, the density was not practically changed from the compact. In Comparative Example 18, as in the case of Comparative Example 17, poor densification due to the loss of the F component and the generation of $MgAl_2O_4$ were apparently observed. In Comparative Examples 19 and 20, $CaF_2$ or $AlF_3$ was added instead of MgF2 and hot-press sintering was performed under conditions similar to those in Example 1; however, a good alumina sintered body could not be obtained. From the results described above, in order to obtain a good alumina sintered body at a low temperature, it was believed that the addition of $MgF_2$ to an alumina powder and hot-press sintering are important.

B. Examples 27 to 57, and Comparative Examples 21 to 26

1. Formation of First Alumina Sintered Body

As a first alumina sintered body, a sintered body was used which was formed in such a way that 0.04 percent by weight of MgO was added as an additive to an alumina powder (average particle diameter of 1 μm) having a purity of 99.5%, and then hot-press sintering was performed at 1,700° C. for 4 hours for densification. In addition, the first alumina sintered body is not limited to that described above, and a commercially available alumina or an alumina added with another additive may also be used.

2. Processing of First Alumina Sintered Body

Next, the first alumina sintered body was processed by grinding, so that a disk having a diameter of 50 mm and a thickness of 5 mm was formed. In this step, one surface of the disk was processed by surface grinding into a flat and smooth surface having a surface roughness Ra of 0.8 μm or less and a surface flatness of 10 μm or less. This surface was used as a printing surface with an electrode paste.

3. Formation of Electrode Pattern

Electrodes investigated in the present invention were roughly classified into two types, that is, a (WC—Ni, Co)—$Al_2O_3$-based electrode and a (Ni, Co)—$Al_2O_3$-based electrode. As electrode raw material powders, powders shown in Table 3 were used. That is, as a Ni powder, a commercially available powder having an average particle diameter of 1 μm or 0.2 μm and a purity of 99.5% or more was used. As a Co powder, a commercially available powder having an average particle diameter of 1 μm and a purity of 99.8% or more was used. As a WC powder, a commercially available powder having an average particle diameter of 0.6 μm or 1.5 μm and a purity of 99.9% or more was used. As an $Al_2O_3$ powder, a commercially available powder having an average particle diameter of 0.1 μm and a purity of 99.99% or more or having an average particle diameter of 0.6 μm and a purity of 99.4% or more was used.

The electrode paste was prepared by mixing an electrode raw material powder shown in Table 3, an organic solvent, a binder, and the like. As the binder and the organic solvent, poly(vinyl butyral) and diethylene glycol monobutyl ether (approximately 1:4 (weight ratio)) were respectively used; however, the binder and the organic solvent were not limited thereto, and another organic solvent may also be used. By using this electrode paste, an electrode pattern in which four strips each having a width of 5 mm and a thickness of approximately 40 μm were disposed in parallel to each other was formed on the surface of the first alumina sintered body by a screen printing method. In this step, the distance between the adjacent strips was set to 5 mm. After the printing, drying was performed at 120° C. in the air. In addition, in an actual semiconductor manufacturing apparatus, of course, an electrode having a shape in accordance with a designed pattern is embedded.

4. Formation of Second Alumina Sintered Body (Corresponding to Alumina Sintered Body of the Present Invention) and Formation of Flat Plate Electrode A second alumina compact was laminated on the surface of the first alumina sintered body on which the electrode pattern was formed. The second alumina compact was formed in accordance with Example 16. That is, after 100 parts by weight of $Al_2O_3$, 0.62 parts by weight of $MgF_2$, and 0.08 parts by weight of MgO were used to prepare a mixed powder, this mixed powder was processed by a uniaxial pressing at a pressure of 30 kgf/cm² to form a disk-shaped compact having a diameter of 50 mm and a thickness of approximately 10 mm, and the disk thus formed was set on the first alumina sintered body on which the electrode pattern was formed. By the step described above, a three-layer laminate including the first alumina sintered body/the electrode pattern/the second alumina compact was obtained. At this stage, the individual strips forming the electrode pattern were embedded with the second alumina compact except for the surfaces in contact with the first alumina sintered body. Next, the laminate was placed inside a graphite die, and hot-press sintering (secondary sintering) was performed. In the secondary sintering, the press pressure was set to 200 kgf/cm², the atmosphere was a vacuum atmosphere, and the holding time was set to 4 hours at a sintering temperature (maximum temperature) shown in Table 3. In addition, in Examples 41, 42, 56, and 57, sintering was performed in a nitrogen atmosphere (150 kPa). As a result, the second compact and the electrode pattern were sintered into the second alumina sintered body and strip-shaped electrodes, and at the same time, the first alumina sintered body, the electrodes, and the second alumina sintered body are tightly fixed to each other, so that an integrated alumina sintered body incorporating the electrodes therein was formed. When the second alumina sintered body was cut off from this integrated alumina sintered body, and various characteristics, such as the density, the porosity, the volume resistivity, the flexural strength, and the average particle diameter, were evaluated, the results were similar to those of an alumina sintered body in which no electrode was embedded. From this result, it was found that the second alumina compact laminated on the electrode pattern is preferably densified at low-temperature sintering, and that various characteristics could be obtained.

In addition, only in Comparative Example 21, as shown in Table 3, a mixed powder containing 100 parts by weight of $Al_2O_3$ and 0.04 parts by weight of MgO was used as the second alumina raw material, and high-temperature sintering was performed at 1,700° C. As the conditions of this high-temperature sintering, the press pressure was set to 200 kgf/cm², a maximum temperature of 1,700° C. was maintained for 4 hours, and the atmosphere was a vacuum atmosphere up to a temperature of 500° C. and was then changed to a nitrogen pressurized atmosphere (150 kPa).

5. Evaluation (1) Electrical Resistivity

A specimen was cut out from the integrated alumina sintered body incorporating the electrodes thus obtained. The specimen was formed to have a rectangular shape having a width of 7 mm, a thickness of 5 mm, and a length of 25 mm. The electrode embedded in this specimen had a width of 5 mm, a thickness of approximately 20 µm, and a length of 25 mm. In addition, in this specimen, the center of the electrode in the width direction coincided with the center of the specimen in the width direction, and the electrode was exposed at two ends of the specimen in the longitudinal direction. As a resistance measurement method, a liquid InGa metal paste was painted on the two ends (at which the electrode was exposed) of the specimen in the longitudinal direction, and the two electrode exposed surfaces were sandwiched by pure Cu plates (oxygen-free copper C1020) with applying a pressure to form a circuit. As the measurement conditions, a minute current of 100 mA to 10 mA was applied at room temperature in the air, and after a minute voltage value at this stage was measured, electrode resistance R was calculated. Subsequently, the electrical resistivity $\rho$ was calculated using an equation represented by $\rho=R\times S/L$ (R: resistance, S: area of electrode exposed surface, L: length of electrode).

(2) Interfacial Shearing Strength

In accordance with the procedure from the above "1. Formation of first alumina sintered body" to "4. Formation of second alumina sintered body and formation of flat plate electrode", a specimen was separately formed. This specimen was formed into a cylindrical shape having a diameter of 9.9 mm and a height of 20 mm and was formed to have the structure in which the first alumina sintered body, the electrode, and the second alumina sintered body were laminated in the thickness direction. In this case, the electrode was not a strip shape and was formed to have the structure in which between the first alumina sintered body and the second alumina sintered body, non electrode printing portions each having a size of 1 mm square were disposed with 1 mm-square intervals in the lateral and the longitudinal directions to form a lattice matrix. In addition, the thickness of the electrode was set to approximately 20 µm. The interfacial shearing strength of this specimen between the first alumina sintered body and the second alumina sintered body was measured by a microdroplet method. As a measurement apparatus, an interfacial property evaluation apparatus for composite materials (manufactured by Toei Sangyo Co., Ltd.) was used.

TABLE 3

| | Second alumina raw material | | | | Sintering condition | |
|---|---|---|---|---|---|---|
| | $Al_2O_3$ | | $MgF_2$ | MgO | Sintering | |
| | Addition amount (Parts by weight) | Particle diamter (µm) | Addition amount (Parts by weight) | Addition amount (Parts by weight) | temperature (° C.) | Atmosphere |
| Example 27 | 100 | 0.1 | 0.62 | 0.08 | 1200 | Vacuum |
| Example 28 | 100 | 0.1 | 0.62 | 0.08 | 1200 | Vacuum |
| Example 29 | 100 | 0.1 | 0.62 | 0.08 | 1200 | Vacuum |
| Example 30 | 100 | 0.1 | 0.62 | 0.08 | 1200 | Vacuum |
| Example 31 | 100 | 0.1 | 0.62 | 0.08 | 1150 | Vacuum |
| Example 32 | 100 | 0.1 | 0.62 | 0.08 | 1150 | Vacuum |
| Example 33 | 100 | 0.1 | 0.62 | 0.08 | 1150 | Vacuum |
| Example 34 | 100 | 0.1 | 0.62 | 0.08 | 1250 | Vacuum |
| Example 35 | 100 | 0.1 | 0.62 | 0.08 | 1250 | Vacuum |
| Example 36 | 100 | 0.1 | 0.62 | 0.08 | 1250 | Vacuum |
| Example 37 | 100 | 0.1 | 0.62 | 0.08 | 1200 | Vacuum |
| Example 38 | 100 | 0.1 | 0.62 | 0.08 | 1200 | Vacuum |
| Example 39 | 100 | 0.1 | 0.62 | 0.08 | 1200 | Vacuum |
| Example 40 | 100 | 0.1 | 0.62 | 0.08 | 1200 | Vacuum |
| Example 41 | 100 | 0.1 | 0.62 | 0.08 | 1200 | Vacuum |
| Example 42 | 100 | 0.1 | 0.62 | 0.08 | 1200 | $N_2$ |
| Example 43 | 100 | 0.1 | 0.62 | 0.08 | 1200 | $N_2$ |
| Example 44 | 100 | 0.1 | 0.62 | 0.08 | 1200 | Vacuum |
| Example 45 | 100 | 0.1 | 0.62 | 0.08 | 1200 | Vacuum |
| Example 46 | 100 | 0.1 | 0.62 | 0.08 | 1200 | Vacuum |
| Example 47 | 100 | 0.1 | 0.62 | 0.08 | 1150 | Vacuum |
| Example 48 | 100 | 0.1 | 0.62 | 0.08 | 1150 | Vacuum |
| Example 49 | 100 | 0.1 | 0.62 | 0.08 | 1150 | Vacuum |
| Example 50 | 100 | 0.1 | 0.62 | 0.08 | 1200 | Vacuum |
| Example 51 | 100 | 0.1 | 0.62 | 0.08 | 1200 | Vacuum |
| Example 52 | 100 | 0.1 | 0.62 | 0.08 | 1200 | Vacuum |
| Example 53 | 100 | 0.1 | 0.62 | 0.08 | 1200 | Vacuum |
| Example 54 | 100 | 0.1 | 0.62 | 0.08 | 1200 | Vacuum |
| Example 55 | 100 | 0.1 | 0.62 | 0.08 | 1200 | Vacuum |
| Example 56 | 100 | 0.1 | 0.62 | 0.08 | 1200 | $N_2$ |

TABLE 3-continued

| | | | | | | |
|---|---|---|---|---|---|---|
| Example 57 | 100 | 0.1 | 0.62 | 0.08 | 1200 | $N_2$ |
| Comparative Example 21 | 100 | 1.0 | — | 0.04 | 1700 | Vacuum/N2 |
| Comparative Example 22 | 100 | 0.1 | 0.62 | 0.08 | 1200 | Vacuum |
| Comparative Example 23 | 100 | 0.1 | 0.62 | 0.08 | 1200 | Vacuum |
| Comparative Example 24 | 100 | 0.1 | 0.62 | 0.08 | 1200 | Vacuum |
| Comparative Example 25 | 100 | 0.1 | 0.62 | 0.08 | 1200 | Vacuum |
| Comparative Example 26 | 100 | 0.1 | 0.62 | 0.08 | 1200 | Vacuum |

| | Electrode raw material | | | | | | | Alumina sintered body incorporating electrode | |
|---|---|---|---|---|---|---|---|---|---|
| | Main material | | Sintering aditive | | Other material | | | | |
| | Kind | Particle diameter (μm) | Addition amount (Parts by weight) | Kind | Addition amount (Parts by weight) | Kind | Particle diameter (μm) | Addition amount (Parts by weight) | Electrical resistivity (Ω·cm) | Interfacial shearing strength (MPa) |
| Example 27 | WC | 0.6 | 98 | Ni | 2 | $Al_2O_3$ | 0.1 | 5 | 3.0E−05 | 175 |
| Example 28 | WC | 0.6 | 95 | Ni | 5 | $Al_2O_3$ | 0.1 | 5 | 2.7E−05 | 210 |
| Example 29 | WC | 0.6 | 90 | Ni | 10 | $Al_2O_3$ | 0.1 | 5 | 2.6E−05 | 118 |
| Example 30 | WC | 0.6 | 75 | Ni | 25 | $Al_2O_3$ | 0.1 | 5 | 2.2E−05 | 91 |
| Example 31 | WC | 0.6 | 98 | Ni | 2 | $Al_2O_3$ | 0.1 | 5 | 3.4E−05 | Not measured |
| Example 32 | WC | 0.6 | 95 | Ni | 5 | $Al_2O_3$ | 0.1 | 5 | 2.8E−05 | Not measured |
| Example 33 | WC | 0.6 | 90 | Ni | 10 | $Al_2O_3$ | 0.1 | 5 | 2.7E−05 | Not measured |
| Example 34 | WC | 0.6 | 98 | Ni | 2 | $Al_2O_3$ | 0.1 | 5 | 2.9E−05 | Not measured |
| Example 35 | WC | 0.6 | 95 | Ni | 5 | $Al_2O_3$ | 0.1 | 5 | 2.6E−05 | Not measured |
| Example 36 | WC | 0.6 | 90 | Ni | 10 | $Al_2O_3$ | 0.1 | 5 | 2.6E−05 | Not measured |
| Example 37 | WC | 0.6 | 98 | Co | 2 | $Al_2O_3$ | 0.1 | 5 | 4.6E−05 | 130 |
| Example 38 | WC | 0.6 | 95 | Co | 5 | $Al_2O_3$ | 0.1 | 5 | 3.5E−05 | 193 |
| Example 39 | WC | 0.6 | 90 | Co | 10 | $Al_2O_3$ | 0.1 | 5 | 3.4E−05 | 215 |
| Example 40 | WC | 0.6 | 75 | Co | 25 | $Al_2O_3$ | 0.1 | 5 | 2.3E−05 | 98 |
| Example 41 | WC | 0.6 | 95 | Ni | 5 | $Al_2O_3$ | 0.1 | 5 | 3.3E−05 | 197 |
| Example 42 | WC | 0.6 | 95 | Co | 5 | $Al_2O_3$ | 0.1 | 5 | 3.8E−05 | 185 |
| Example 43 | Ni | 1.0 | 100 | — | — | $Al_2O_3$ | 0.1 | 5 | 1.2E−05 | 73 |
| Example 44 | Ni | 1.0 | 100 | — | — | $Al_2O_3$ | 0.1 | 8 | 1.5E−05 | 84 |
| Example 45 | Ni | 1.0 | 100 | — | — | $Al_2O_3$ | 0.1 | 11 | 1.8E−05 | 91 |
| Example 46 | Ni | 1.0 | 100 | — | — | $Al_2O_3$ | 0.1 | 30 | 4.2E−05 | 130 |
| Example 47 | Ni | 1.0 | 100 | — | — | $Al_2O_3$ | 0.1 | 5 | 1.2E−05 | Not measured |
| Example 48 | Ni | 1.0 | 100 | — | — | $Al_2O_3$ | 0.1 | 8 | 1.4E−05 | Not measured |
| Example 49 | Ni | 1.0 | 100 | — | — | $Al_2O_3$ | 0.1 | 11 | 1.7E−05 | Not measured |
| Example 50 | Ni | 0.2 | 100 | — | — | $Al_2O_3$ | 0.1 | 5 | 1.2E−05 | Not measured |
| Example 51 | Ni | 0.2 | 100 | — | — | $Al_2O_3$ | 0.1 | 8 | 1.5E−05 | Not measured |
| Example 52 | Ni | 0.2 | 100 | — | — | $Al_2O_3$ | 0.1 | 11 | 1.8E−05 | Not measured |
| Example 53 | Co | 1.0 | 100 | — | — | $Al_2O_3$ | 0.1 | 5 | 1.0E−05 | 78 |
| Example 54 | Co | 1.0 | 100 | — | — | $Al_2O_3$ | 0.1 | 8 | 1.3E−05 | 90 |
| Example 55 | Co | 1.0 | 100 | — | — | $Al_2O_3$ | 0.1 | 11 | 1.6E−05 | 97 |
| Example 56 | Ni | 1.0 | 100 | — | — | $Al_2O_3$ | 0.1 | 11 | 1.8E−05 | 90 |
| Example 57 | Co | 1.0 | 100 | — | — | $Al_2O_3$ | 0.1 | 11 | 1.7E−05 | 96 |
| Comparative Example 21 | WC | 1.5 | 100 | — | — | $Al_2O_3$ | 0.6 | 5 | 2.7E−05 | 70 |
| Comparative Example 22 | WC | 1.5 | 100 | — | — | $Al_2O_3$ | 0.6 | 5 | (*) | (*) |
| Comparative Example 23 | WC | 0.6 | 100 | — | — | $Al_2O_3$ | 0.1 | 5 | 3.5E−04 | 45 |
| Comparative Example 24 | Ni | 1.0 | 100 | — | — | — | — | — | 9.5E−06 | 56 |
| Comparative Example 25 | Ni | 0.2 | 100 | — | — | — | — | — | 9.4E−06 | 53 |
| Comparative Example 26 | Co | 1.0 | 100 | — | — | — | — | — | 9.1E−06 | 55 |

(*): Electrical resistivity could not be measured due to insufficient densification (3) Results (a) High-Temperature Sintering Technique In Comparative Example 21, when a mixed powder containing $Al_2O_3$ and MgO ($MgF_2$ was not contained) was used as the second alumina raw material, a mixed powder containing WC and $Al_2O_3$ (transition metal was not contained) was used as the electrode raw material, and a WC—$Al_2O_3$ electrode was sufficiently sintered at a high sintering temperature of 1,700° C., the electrical resistivity of the electrode was $2.7 \times 10^{-5}$ Ω·cm, and the interfacial shearing strength was 70 MPa. From this result, an electrical resistivity of $5.0 \times 10^{-5}$ Ω·cm or less was set as the criterion of an electrical resistivity obtained by sufficient sintering, and an electrode which satisfied this criterion was regarded as a heater electrode which could be preferably used. In addition, an interfacial shearing strength of 70 MPa or more was set as the criterion, and when this criterion was satisfied, it was evaluated that the interfacial bonding strength between the alumina sintered body and the electrode was sufficiently high.

(b) Low-Temperature Sintering Technique (Using WC-Based Electrode)

In Comparative Examples 22 and 23, a mixed powder (mixed powder containing $Al_2O_3$, MgO, and $MgF_2$) of Example 16 was used as the second alumina raw material, a mixed powder containing WC and $Al_2O_3$ (transition metal was not contained) was used as the electrode raw material, and sintering was performed at a sintering temperature of 1,300° C. or less (low temperature). In Comparative Example 22, although sintering was performed at 1,200° C. using the same electrode raw material as that of Comparative Example 21, the electrical resistivity could not be measured due to the lack of densification of the electrode. In addition, in Comparative Example 23, although a mixed powder containing $Al_2O_3$ and fine-grain WC was used, densification of the electrode was still insufficient, and the criteria of the electrical resistivity and the interfacial shearing strength were not satisfied. On the other hand, in Examples 27 to 42, when a mixed powder containing WC, a transition metal (Ni or Co), and $Al_2O_3$ was used as the electrode raw material, even if the sintering temperature was 1,300° C. or less, the electrical resistivity of each example was $5.0 \times 10^{-5}$ Ω·cm or less, and the criterion was satisfied. According to the results of SEM observation, when a transition metal was added, the WC raw material was densely sintered to form an interlinked structure, and hence it was estimated that this structure contributed to decrease the resistance. When a transition metal was not added, the structure as described above was not observed. In addition, when the amounts of transition metals to be added were equal to each other, the effect of decreasing the resistance is significant in the order of from Ni to Co. In addition, as for the interfacial shearing strength, in Examples 27 to 30, and 37 to 40, the criterion was satisfied. In Examples 31 to 36 in which the sintering temperature was changed, although the interfacial shearing strength was not measured, it is estimated that the criterion of the interfacial shearing strength is satisfied as in the cases of Examples 27 to 30 and 37 to 40. In addition, also in Examples 41 and 42 in which nitrogen atmospheric sintering was performed, as in the case of the product obtained by vacuum atmospheric sintering, the criteria of the electrical resistivity and the interfacial shearing strength were both satisfied.

(c) Low-Temperature Sintering Technique (Using Ni-Based, Co-Based Electrode)

In Comparative Examples 24 to 26, when a mixed powder (mixed powder containing $Al_2O_3$, MgO, and $MgF_2$) of Example 16 was used as the second alumina raw material, a Ni powder or a Co powder ($Al_2O_3$ was not contained) was used as the electrode raw material, and sintering was performed at a sintering temperature of 1,300° C. or less (low temperature), although the criterion of the electrical resistivity was satisfied, the interfacial shearing strength was low, and hence the criterion thereof was not satisfied. From the microstructure observation by a SEM, separation was partially recognized at the interface between the electrode and the second alumina sintered body, and hence it was found that the interfacial bonding was not sufficient. On the other hand, in Examples 43 to 57, when a mixed powder containing $Al_2O_3$ and Ni or Co was used as the electrode raw material, even if the sintering temperature was 1,300° C. or less, the electrical resistivity of each example was sufficiently low, such as $5.0 \times 10^{-5}$ Ω·cm or less. In addition, when the sintering temperatures were equal to each other, the tendency was observed in which the electrical resistivity was increased as the addition amount of $Al_2O_3$ was increased. On the other hand, as for the interfacial shearing strength, in all Examples 43 to 46, the criterion was satisfied. Since the separation at the interface between the electrode and the second alumina sintered body was not observed by the microstructure observation, it was believed that by addition of $Al_2O_3$ to the electrode, besides an effect of decreasing the thermal expansion coefficient of the electrode, an effect of improving the interfacial bonding strength between the electrode and the second alumina sintered body was obtained by $Al_2O_3$ thus added. In Examples 47 to 52, although the interfacial shearing strength was not measured, as in the case of Examples 43 to 46, it is estimated that the criterion of the interfacial shearing strength is satisfied. In addition, also in Examples 56 and 57 in which nitrogen atmospheric sintering was performed, as in the product obtained by vacuum atmospheric sintering, the criteria of the electrical resistivity and the interfacial shearing strength were both satisfied.

Furthermore, the volume resistivity of the integrated alumina sintered body incorporating the electrodes was measured in accordance with the procedure (4) of "5. Evaluation" of "A. Examples 1 to 26, and Comparative Examples 1 to 20". In this case, the embedded electrode was used as an application electrode, and a sample was formed so that the thickness of the first alumina sintered body and that of the second alumina sintered body were each 0.5 mm. When Examples 28, 38, 41, 42, 45, and 55 to 57 were selected as representative materials and were evaluated, as a result, it was confirmed that the volume resistivity of each of the first and the second alumina sintered bodies was $1.0 \times 10^{14}$ Ω·cm or more, and that the embedded electrode causes no degradation of the insulation characteristics of the alumina sintered body. In addition, as a result of an EPMA analysis in the vicinity of the electrode interface, the diffusion of the electrode component to the first and the second alumina sintered bodies was not apparently observed, and the diffusion of the second alumina additives, such as Mg and the F component, to the electrode side was also not recognized. From the results described above, it is believed that by the electrode thus embedded, the electrical resistivity of the alumina sintered body was not changed.

C. Example 58

An alumina sintered body (corresponding to an alumina sintered body of the present invention) is formed of a laminate including a compact/a flat plate electrode/a compact. First, a first alumina compact was formed in accordance with Example 16. Then, Ni—$Al_2O_3$-based electrode shown in Table 3 was printed on the first alumina sintered body. After the printing, drying was performed at 120° C. in the air. For an electrode raw material, the addition amount of $Al_2O_3$ having an average particle diameter of 0.1μ is set to 11 parts by weight to 100 parts by weight of Ni having an average particle diameter of 1μ. Next, a second alumina compact which was formed using the same material as Example 16, was laminated on the surface of the first alumina sintered body on which the electrode was printed so as to obtain a laminate including a compact/a flat plate electrode/a compact. Sintering of the laminate is performed in the same manner similar to that of Example 16. As a result, the first alumina compact, the second alumina compact, and electrode pattern were sintered so that an integrated alumina sintered body incorporating the electrodes therein was formed. A property evaluation was performed in the same manner similar to that in Example 16.

When the first and second alumina sintered portions, which were derived from the first and second alumina compacts, were cut off from this integrated alumina sintered body, and various characteristics, such as the density, the porosity, the volume resistivity, the flexural strength, and the average particle diameter, were evaluated, the results were similar to those of Example 16. Regarding the characteristics of the integrated alumina sintered body incorporating the electrodes, the electrical resistivity of the electrode was 1.8E-5 Ω·cm, and the interfacial shearing strength was 95 MPa, were obtain. Accordingly, it is confirmed that the good integrated alumina sintered body incorporating the electrodes was obtained. From these results, it is considered that the alumina sintered body and electrode which are prepared by different alumina raw composition and electrode composition according to the present invention have similar characteristics as shown in above Example.

The present application claims the benefit of the priority from Japanese Patent Application No. 2009-077266 filed on Mar. 26, 2009, Japanese Patent Application No. 2009-200753 filed on Aug. 31, 2009, and Japanese Patent Application No. 2010-010001 filed on Jan. 20, 2010, the entire contents of all of which are incorporated herein by reference.

What is claimed is:

1. An alumina sintered body comprising magnesium and fluorine, wherein a constituent crystalline phase is composed of only $Al_2O_3$, or wherein the constituent crystalline phase includes alumina and at least one other constituent phase of $MgF_2$ or $MgF_2$ and $MgAl_2O_4$, wherein an open porosity is less than 0.1%, a bulk density is 3.95 g/cm$^3$ or more, and a volume resistivity, calculated from a current value 1 minute after application of 2 kV/mm at room temperature, is $1\times10^{14}$ Ω·cm or more.

2. The alumina sintered body according to claim 1, wherein a relative density is 99.5% or more.

3. The alumina sintered body according to claim 1, wherein a flexural strength is 300 MPa or more.

4. The alumina sintered body according to claim 1, wherein the alumina sintered body comprises 0.03 to 0.8 percent by weight of Mg and 0.01 to 1.2 percent by weight of F.

5. The alumina sintered body according to claim 1, wherein the constituent crystalline phase is composed of (i) only $Al_2O_3$, (ii) $Al_2O_3$ and $MgF_2$, or (iii) $Al_2O_3$, $MgF_2$, and $MgAl_2O_4$, and no other crystalline phase is included.

6. The alumina sintered body according to claim 1, wherein a first electrode, containing WC, $Al_2O_3$, and at least one transition metal selected from the group consisting of Ni and Co, or a second electrode containing $Al_2O_3$ and at least one transition metal selected from the group consisting of Ni and Co, is embedded in or laminated in the alumina sintered body.

7. The alumina sintered body according to claim 1, wherein the alumina sintered body is manufactured by a method comprising the steps of:
(a) forming a mixed powder containing at least $Al_2O_3$ and $MgF_2$, or a mixed powder containing $Al_2O_3$, $MgF_2$, and MgO, into a compact having a predetermined shape; and
(b) hot-press sintering the compact in a vacuum atmosphere to form an alumina sintered body, in which when a amount of $MgF_2$ to 100 parts by weight of $Al_2O_3$ is represented by X, in parts by weight, and a hot-press sintering temperature is represented by Y, in ° C., the hot-press sintering temperature is set to satisfy the following equations (1) to (4):

$$1{,}120 \leq Y \leq 1{,}300 \quad (1),$$

$$0.15 \leq X \leq 1.89 \quad (2),$$

$$Y \leq -78.7X + 1{,}349 \quad (3), \text{ and}$$

$$Y \geq -200X + 1{,}212 \quad (4).$$

8. The alumina sintered body according to claim 7, further comprising
a first electrode, containing WC, $Al_2O_3$, and at least one transition metal selected from the group consisting of Ni and Co or a second electrode containing $Al_2O_3$ and at least one transition metal selected from the group consisting of Ni and Co, that is embedded in or laminated on the alumina sintered body;
wherein in the method for manufacturing the alumina sintered body, in the step (a), when or after the mixed powder is formed into the compact, a first electrode raw material containing WC, $Al_2O_3$, and at least one transition metal selected from the group consisting of Ni and Co or a second electrode raw material containing $Al_2O_3$ and at least one transition metal selected from the group consisting of Ni and Co is shaped into a predetermined shape and is embedded in or laminated on the compact.

9. A semiconductor manufacturing apparatus member formed by using the alumina sintered body according to claim 1.

10. The alumina sintered body according to claim 1, wherein the alumina sintered body is manufactured by a method comprising the steps of:
(a) forming a mixed powder containing at least $Al_2O_3$ and $MgF_2$, or a mixed powder containing $Al_2O_3$, $MgF_2$, and MgO, into a compact having a predetermined shape; and
(b) hot-press sintering the compact in a non-oxidizing atmosphere to form an alumina sintered body, in which when a amount of $MgF_2$ to 100 parts by weight of $Al_2O_3$ is represented by X, in parts by weight, and a hot-press sintering temperature is represented by Y, in ° C., the hot-press sintering temperature is set to satisfy the following equations (1) to (4):

$$1{,}120 \leq Y \leq 1{,}300 \quad (1),$$

$$0.15 \leq X \leq 1.89 \quad (2),$$

$$Y \leq -78.7X + 1{,}349 \quad (3), \text{ and}$$

$$Y \geq -200X + 1{,}212 \quad (4).$$

* * * * *

UNITED STATES PATENT AND TRADEMARK OFFICE
CERTIFICATE OF CORRECTION

| | |
|---|---|
| PATENT NO. | : 8,178,455 B2 |
| APPLICATION NO. | : 12/722773 |
| DATED | : May 15, 2012 |
| INVENTOR(S) | : Naomi Teratani et al. |

Page 1 of 1

It is certified that error appears in the above-identified patent and that said Letters Patent is hereby corrected as shown below:

Title Page, Item (73) Assignee: change "NGK Insulatores, Ltd." to

--NGK Insulators, Ltd.--

Signed and Sealed this
Tenth Day of July, 2012

David J. Kappos
*Director of the United States Patent and Trademark Office*